United States Patent [19]
Plueddemann

[11] 4,010,668
[45] Mar. 8, 1977

[54] POLYSONIC ELECTRONIC SYSTEM FOR A MUSICAL INSTRUMENT AND METHODS OF UTILIZING AND CONSTRUCTING SAME

[76] Inventor: John P. Plueddemann, 21370 Inkster Road, Southfield, Mich. 48075

[22] Filed: Apr. 21, 1975

[21] Appl. No.: 569,835

[52] U.S. Cl. ................................ 84/1.16; 84/1.15; 84/DIG. 1; 84/DIG. 27; 179/1 GQ; 179/1 M

[51] Int. Cl.² ..................... G10H 3/08; H04M 1/00

[58] Field of Search .................. 84/1.01, 1.14–1.16, 84/DIG. 1, 27; 179/1 G, 1 GA, 1 GP, 1 GQ, 1 M

[56] References Cited

UNITED STATES PATENTS

| | | | |
|---|---|---|---|
| 2,784,631 | 3/1957 | Fender | 84/1.16 |
| 3,147,332 | 9/1964 | Fender | 84/1.16 X |
| 3,629,483 | 12/1971 | Welch | 84/1.15 X |

*Primary Examiner*—E. S. Jackmon
*Attorney, Agent, or Firm*—Irving M. Weiner; Pamela S. Austin; Melvin Yedlin

[57] ABSTRACT

An acoustical system of magnetic pick-ups and connecting circuits are provided for an electric guitar, wherein the output of the pick-ups is amplified and fed into separate speakers. The system provides stereophonic effects in which the sound appears to move around the room.

7 Claims, 1 Drawing Figure

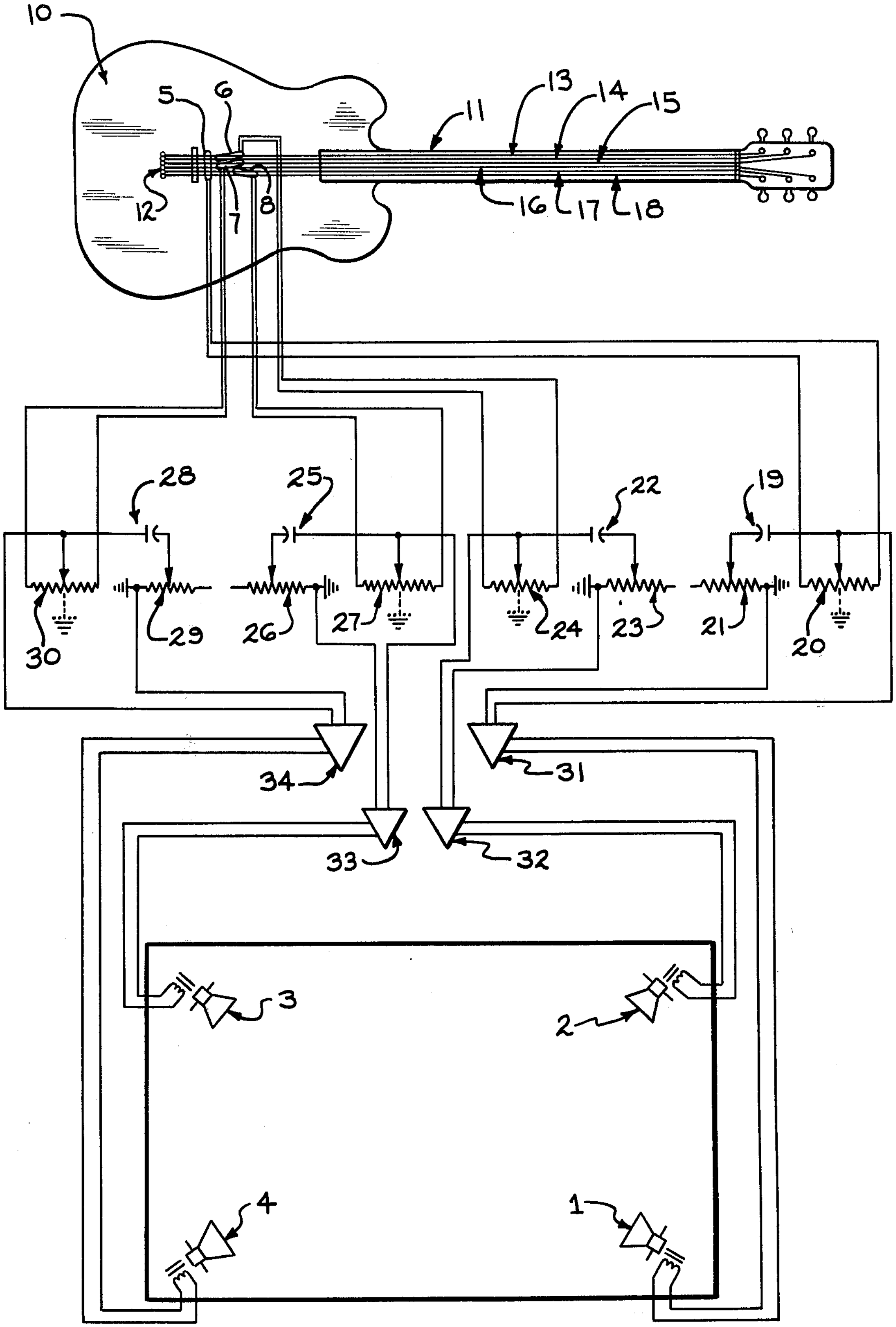
10
5
6
7
8
11
12
13
14
15
16
17
18
19
20
21
22
23
24
25
26
27
28
29
30
31
32
33
34
1
2
3
4

POLYSONIC ELECTRONIC SYSTEM FOR A MUSICAL INSTRUMENT AND METHODS OF UTILIZING AND CONSTRUCTING SAME

The present invention relates to a polysonic electronic system for a musical instrument. In particular, this invention relates to a system of magnetic pick-ups and connecting circuits for an electric guitar which produces a unique quadrophonic sound effect.

BACKGROUND OF THE INVENTION

With the advent of solid-state electronics, the use of electronic amplification for stringed instruments has been widespread. This is accomplished primarily through positioning of electromechanical transducers and sound pick-up devices, on the soundboard in coupled relationship with the strings. Along with amplification various stereo sound effects have also been achieved.

Accomplishments in this area are exemplified by: U.S. Pat. Re No. 25,728 patented on Feb. 16, 1965 by Q. H. Freeman entitled "Stringed Musical Instrument"; U.S. Pat. No. 3,290,424 patented on Dec. 6, 1966 by C. L. Fender entitled "Electric Guitar Incorporating Improved Electromagnetic Pick-up Assembly, and Improved Circuit Mean"; U.S. Pat. No. 3,483,303 patented on Dec. 9, 1969 by L. A. Warner entitled "Elongated Pickup for Metal Stringed Musical Instruments Having Ferromagnetic Shielding"; and U.S. Pat. No. 602,627 patented Aug. 31, 1971 by William G. L. McGammon entitled "Sound Pick-Up Method and Apparatus for Stringed Instruments."

One of the principle objects of the present invention is to provide a harmonizing sound that appears to move around a room at substantial volume levels which are free from localized distortion and unpleasant loudness.

SUMMARY OF THE INVENTION

The present invention provides an acoustical system for an instrument having a plurality of strings. The acoustical system includes first means for detecting and amplifying sounds produced by a first predetermined number of the plurality of strings. The acoustical system also includes second means for detecting and amplifying sounds produced by a second predetermined number of the plurality of strings. The acoustical system also includes third means for detecting and amplifying sounds produced by a third predetermined number of a plurality of strings. Finally, the acoustical system also includes fourth means for detecting and amplifying the sounds produced by a fourth predetermined number of the plurality of strings of the instrument.

The present invention also provides an acoustical system comprising an electric guitar, a system of magnetic pick-ups and connecting circuits which produces a unique quadrophonic sound effect.

Four magnetic pick-ups are attached to the body of the guitar between the bridge and fingerboard. The first pick-up will respond to one or any number of the strings thereby producing a rhythm component. Pick-up number two is placed below pick-up number one and placed in such a position to allow it to pick up the two outer strings of the guitar. Pick-up number three is also placed below pick-up number one and placed in such a position to pick up the middle two strings of the guitar. Pick-up number four is also placed below pick-up number one in such a position to pick up the last two strings of the guitar. The output from each of the above-mentioned pick-ups is individually amplified and fed to individual speakers positioned at the four corners of a room.

It is an object of the present invention to produce a sound when the guitar is strummed whereby each speaker harmonizes in concert with the rhythm speaker giving the effect of the sound moving around the room.

A further object of the present invention is to provide substantial volume levels from the speaker arrangement which are free from localized distortion and unpleasant loudness.

Other objects and advantageous features of the present invention will appear from the following description and appended claims, reference being had to the accompanying nonlimiting drawing forming a part of this specification.

BRIEF DESCRIPTION OF THE DRAWING

The drawing illustrates a preferred embodiment of the present invention depicting a guitar with the several pick-ups in position, and a diagrammatical layout of the electronic system showing the speakers in relative locations.

DETAILED DESCRIPTION OF A PREFERRED EMBODIMENT OF THE PRESENT INVENTION

Before explaining the present invention in detail, it is to be understood that the present invention is not limited in its application or uses to the details of construction and arrangement of parts illustrated in the accompanying drawing, because the present invention is capable of other embodiments and of being practiced or carried out in various ways. Furthermore, it is to be understood that the phraseology or terminology employed herein is for the purpose of description, and not of limitation.

The accompanying drawing depicts schematically an acoustical system according to the present invention.

With reference to the drawing a guitar is shown having a soundboard 10, fingerboard 11, a bridge 12, and a plurality of strings 13, 14, 15, 16, 17, and 18. Mounted on the soundboard 10 are four sound magentic pick-up devices 5, 6, 7 and 8. The sound pick-up devices 5, 6, 7 and 8 form part of first, second, third and fourth means, respectively, which are described in detail hereinbelow.

Pick-up 5 is shown closest to the bridge 12 and arranged substantially perpendicular to the strings 13, 14, 15, 16, 17 and 18. Pick-up 6 is positioned under strings 13 and 14. Pickup 7 is positioned under strings 15 and 16. Pick-up 8 is positioned under strings 17 and 18.

The first pick-up 5 is electrically connected to a first electrical control circuit including capacitor 19, a rheostat 21, and a potentiometer 20. These elements as a group serve as a volume and/or tone control. This group in turn is electrically connected to a first amplifier 31 which, in turn, is electrically connected to a first speaker 1.

The second pick-up 6 is electrically connected to a second electrical control circuit including a capacitor 22, a rheostat 23, and a potentiometer 24. This group in turn is electrically connected to a second amplifier 32, and then on to a second speaker 2.

The third pick-up 7 is electrically connected to a third electrical control circuit including a capacitor 28, a rheostat 29, and a potentiometer 30. This group in turn is electrically connected to a third amplifier 34, and then on to a third speaker 4.

The fourth pick-up 8 is electrically connected to a fourth electrical control circuit including a capacitor 25, a rheostat 26, and a potentiometer 27. This group in turn is electrically connected to a fourth amplifier 33, and then on to a fourth speaker 3.

The present invention contemplates that the first means, including the first pick-up 5, responds to and detects and amplifies sounds produced by a first predetermined number of the strings of the instrument, which in the case illustrated in the accompanying drawing responds to all of the strings of the instrument to produce a rhythm component of the sound. Simultaneously, the second means, including pick-up 6, responds to and detects and amplifies sounds produced by a second predetermined number of the strings, viz., only strings 13 and 14. In a similar fashion and simultaneously therewith, the third means including pick-up 7, responds to and detects and amplifies sounds produced by a third predetermined number of the stings of the instrument, viz., only strings 15 and 16. In a similar fashion and simultaneously therewith, the fourth means, including the fourth pick-up 8, responds to and detects and amplifies sounds produced by a fourth predetermined number of the strings of the instrument, viz., only strings 17 and 18.

Consequently, it can be seen from the description set forth hereinabove that four separate and distinct pick-up and detection and amplifying channels are produced for the various and predetermined strings of the instrument. This novel acoustical system and arrangement of components achieves some very surprising and unexpected results. In particular, as the guitar is strummed, the composite sound produced by the various speakers which may, for example, be disposed in the four corners of a room, appears to move around the room. In addition, the sound components emanating from speakers 2, 3 and 4 harmonizes with the rhythm sounds emanating from speaker number 1. This results in a surprising stereo effect on all three or four corners of the room.

One of the principal advantages attained by the afore-described acoustical system as compared to the prior art systems is that instead of a loud deafening noise out of one amplifier and speaker, the present invention achieves the "effects" of loud volume, but actually at a lower decibel volume because the room is completely filled with sound by which is balanced out proportionately with respect to the various corners of the room.

It is apparent from the above detailed description of this invention that it provides an increased tonal quality with a stereophonic effect.

The present invention is not limited to use in conjunction with guitars. Rather, it may be used with any stringed instrument, such as banjos, ukuleles, pianos, harps, zithers, basses, mandolins, harpsichords, lyres, lutes, sitars, etc.

Furthermore, the invention is not limited to four pick-ups and speakers.

Although the particular embodiment illustrated in the accompanying drawing shows rather elongated pick-up members, the present invention provides that the commercial version thereof will utilize shorter pick-up members which have a length merely sufficient to underlie and respond to the two strings of the musical instrument associated with the electrical pick-up in question.

I claim:

1. An accoustical system for an instrument having a plurality of strings, comprising, in combination:

first means for detecting and amplifying sounds produced by a first predetermined number of said plurality of strings;

second means for detecting and amplifying sounds produced by a second predetermined number of said plurality of strings;

third means for detecting and amplifying sounds produced by a third predetermined number of said plurality of strings; and fourth means for detecting and amplifying sounds produced by a third predetermined number of said plurality of strings;

said instrument includes a bridge;

said first means includes a first pick-up electrically connected to a first electrical control circuit which is electrically connected to a first amplifier that is electrically connected to a first speaker;

said second means includes a second pick-up electrically connected to a second electrical control circuit which is electrically connected to a second amplifier that is electrically connected to a second speaker;

said third means includes a third pick-up electrically connected to a third electrical control circuit which is electrically connected to a third amplifier that is electrically connected to a third speaker;

said fourth means includes a fourth pick-up electrically connected to a fourth electrical control circuit which is electrically connected to a fourth amplifier that is electrically connected to a fourth speaker;

said instrument comprises a guitar;

said first means detects and amplifies sounds produced by all of said plurality of strings to provide a rhythm component of the sound;

said second means detects and amplifies the sounds produced solely by the first third of said strings of the guitar;

said third means detects and amplifies the sounds produced solely by the second third of said plurality of strings of the guitar;

said fourth means detects and amplifies the sounds produced solely by the third of said plurality of strings of the guitar;

said speakers being positioned at the four corners of a room so that as the guitar is strummed, the sound emanating from said speakers would seem to move around the room;

said speakers being so arranged in the room so that the sound emanating from said second, third and fourth speakers harmonizes with the sound emanating from said first speaker to give a stereo effect from the corners of the room; and each of said first, second, third and fourth means having its own volume and tone control so that the room may be completely filled with sound which is balanced out proportionately at the corners of the room.

2. An acoustical system characterized in accordance with claim 1, wherein:

said first means includes said first pick-up disposed nearest to said bridge of said instrument in a substantially perpendicular relationship with said string; and said first means responds to any combination of said strings thereby producing a rhythm component which is individually amplified by said first amplifier and fed into said first speaker.

3. An acoustical system characterized in accordance with claim 1, wherein:

said second means includes said second pick-up that responds to the first two strings of said instrument and produces a signal which is amplified by said second amplifier and fed into said second speaker.

4. An acoustical system characterized in accordance with claim 1, wherein:

said third means includes said third pick-up that responds to the second two strings of said instrument and produces a signal which is amplified by said third amplifier and fed into said third speaker.

5. An acoustical system characterized in accordance with claim 1, wherein:

said fourth means includes said fourth pick-up that responds to the last two strings of said instrument and produces a signal which is amplified by said fourth amplifier and fed into said fourth speaker.

6. An acoustical system characterized in accordance with claim 1, wherein:

said first, second, third and fourth speakers are spaced equidistantly apart around a room so that as said instrument is played, the sound emanating from said speakers appears to move around said room.

7. An acoustical system characterized in accordance with claim 1, wherein:

each of said first, second, third and fourth electrical control circuits includes separate tone and volume controls.

* * * * *